INVENTOR
J. L. FLANAGAN
BY G. E. Hirsch Jr.
ATTORNEY

Dec. 24, 1968 J. L. FLANAGAN 3,417,837

SIGNAL PROCESSOR FOR MULTIPATH SIGNALS

Filed Sept. 30, 1966 4 Sheets-Sheet 4

United States Patent Office 3,417,837

Patented Dec. 24, 1968

3,417,837

SIGNAL PROCESSOR FOR MULTIPATH SIGNALS

James L. Flanagan, Warren Township, Somerset County, N.J., assignor to Bell Telephone Laboratories, Incorporated, Murray Hill, N.J., a corporation of New York Filed Sept. 30, 1966, Ser. No. 583,185
25 Claims. (Cl. 181—.5)

ABSTRACT OF THE DISCLOSURE

Signals transmitted through a multipath transmission medium are processed by an array of frequency inverse filters each with selected phase and amplitude characteristics so as to improve the quality of a received signal. Conversely, an undistorted signal can be transmitted by an array of transducers to a selected point in space by first passing the signal to be transmitted through an array of appropriate frequency inverse filters.

This invention relates to signal processing and in particular to the processing of acoustic signals transmitted over multiple transmission paths from a source to a receiver in a bounded reverberant medium.

In a bounded reverberant medium, such as a room, a sound studio, or an auditorium, an acoustic signal often travels from a source to each receiving element in an array of such elements over several transmission paths rather than over a single transmission path. As a result, each receiving element usually detects several unequally attenuated and unequally synchronized versions of the transmitted signal. Consequently, the replica of the transmitted signal produced from the signals detected by the receiving elements is often of poorer quality than desired due to the mutual interference of the received versions of the transmitted signal.

Accordingly, an object of this invention is to produce a high quality replica of a signal transmitted from a source to an array of receiving elements despite the receipt of two or more unsynchronized and unequally attenuated versions of the transmitted signal at each receiving element in the array.

Conversely, the transmission of a given waveform by an array of transmitting elements to a selected point or "focal volume" in a bounded reverberant medium is likewise difficult because the reverberant medium sustains multiple transmission paths from each transmitting element in the array to the selected point. Thus a listener at the selected point again hears a number of unsynchronized and unequally attenuated versions of the transmitted signal.

Thus, another object of this invention is to produce a high quality replica of a signal transmitted by an array of transmitting elements to a selected point in a bounded reverberant volume.

One known way of partly overcoming the interference caused by multiple transmission paths from a source to a receiver is to use only one of the received versions of the transmitted signal to produce a replica of the transmitted signal. The remaining versions are discarded. Unfortunately if the received versions overlap in time, it is often impossible to prevent some mutual interference between the "retained" and the "discarded" versions.

This invention, on the other hand, effectively separates the first received version of a transmitted signal from the other received versions of this signal, despite the fact that all the received versions of the transmitted signal overlap somewhat in time. Thus, the replica of the transmitted signal obtained by this invention is of improved quality over the replica obtained by the prior art.

Thus, according to this invention, the distortion of a signal transmitted from a source to each receiving element in an array of receiving elements is compensated for by passing the signal received at each receiving element through a so-called frequency-inverse filter; that is, a filter with phase and amplitude characteristics inverse to the phase and amplitude characteristics of the multipath transmission channel between that receiving element and the source. Conversely, the distortion of a signal transmitted from each transmitting element in an array of transmitting elements to a focal volume is compensated for by passing the signal to be transmitted by each transmission element through a frequency-inverse filter with amplitude and phase characteristics inverse to those of the transmission channel between that transmitting element and the focal volume.

In one embodiment of this invention, a frequency-inverse filter which compensates for the amplitude and phase distortion of a multigraph, nondispersive transmission channel is obtained by placing a so-called transversal filter in the feedback path of a feedback network with unity forward gain. The signal to be processed, either a received signal or a signal to be transmitted, is passed through the feedback network. A feedback signal, generated by weighting and then summing signals obtained from taps on a delay line in the transversal filter, is subtracted from the input signal to the feedback network to produce an output signal. This output signal is amplified a selected amount and then delayed to synchronize it with similar output signals from other receiving or transmitting element-filter combinations. When combined, all the similarly filtered output signals form a high quality replica of the transmitted signal.

In accordance with this embodiment of the invention, the taps on the delay line are placed so that their associated delays correspond on a one-to-one basis to the so-called differential delays associated with the multiple transmission paths between the source and the receiving element or between the transmitting element and the focal volume.

An approximate implementation of this frequency-inverse filter passes the signal to be filtered directly into a delay line, rather than into a feedback network containing a delay line in its feedback path. This delay line possesses output taps placed so that the delays associated with the taps correspond, as in the first embodiment, to the differential delays associated with the multiple transmission paths between the source and the receiving element or between the transmitting element and the focal volume. The output signal from each tap except the first is weighted a selected amount. Then the output signals from the second through the last taps on the delay line are summed and subtracted from the undelayed and unattenuated output signal from the first tap. As in the first embodiment, the signal resulting from this subtraction process is amplified a selected amount and is then delayed to synchronize it with similarly derived output signals from other receiving or transmitting element-filter combinations. Again, when all such similarly filtered signals are combined, either at the receiving elements or at the focal volume, as appropriate, a good quality replica of the transmitted signal is obtained.

A frequency-inverse filter suitable for use with a dispersive transmission channel is obtained by placing taps on the delay line in the feedback network of the first embodiment so as to produce a differential delay at each tap equal to the Nyquist sampling interval. By appropriately weighting the output signal from each tap, and then summing all such output signals, a feedback network, adaptable for use in a frequency-inverse filter matched to any selected dispersive transmission medium, is obtained.

The principles of this invention can, in addition, be utilized to construct a system capable of pinpointing the location of the source of a sound of known characteristics in a bounded reverberant volume. The transmission characteristics between each point in such a volume and the receiving elements in a fixed array of such elements are usually unique. When this is the case, the known signal from a source at an unknown location is passed through sets of filters corresponding to selected points throughout the volume. The most probable location of the source of the known signal is in the vicinity of the point corresponding to the set of frequency-inverse filters which yields the best replica of the known sound.

This invention may be more fully understood from the following detailed description taken together with the drawings in which.

*Theory and description of a frequency-inverse filter*

Figures 3, 4, 5:
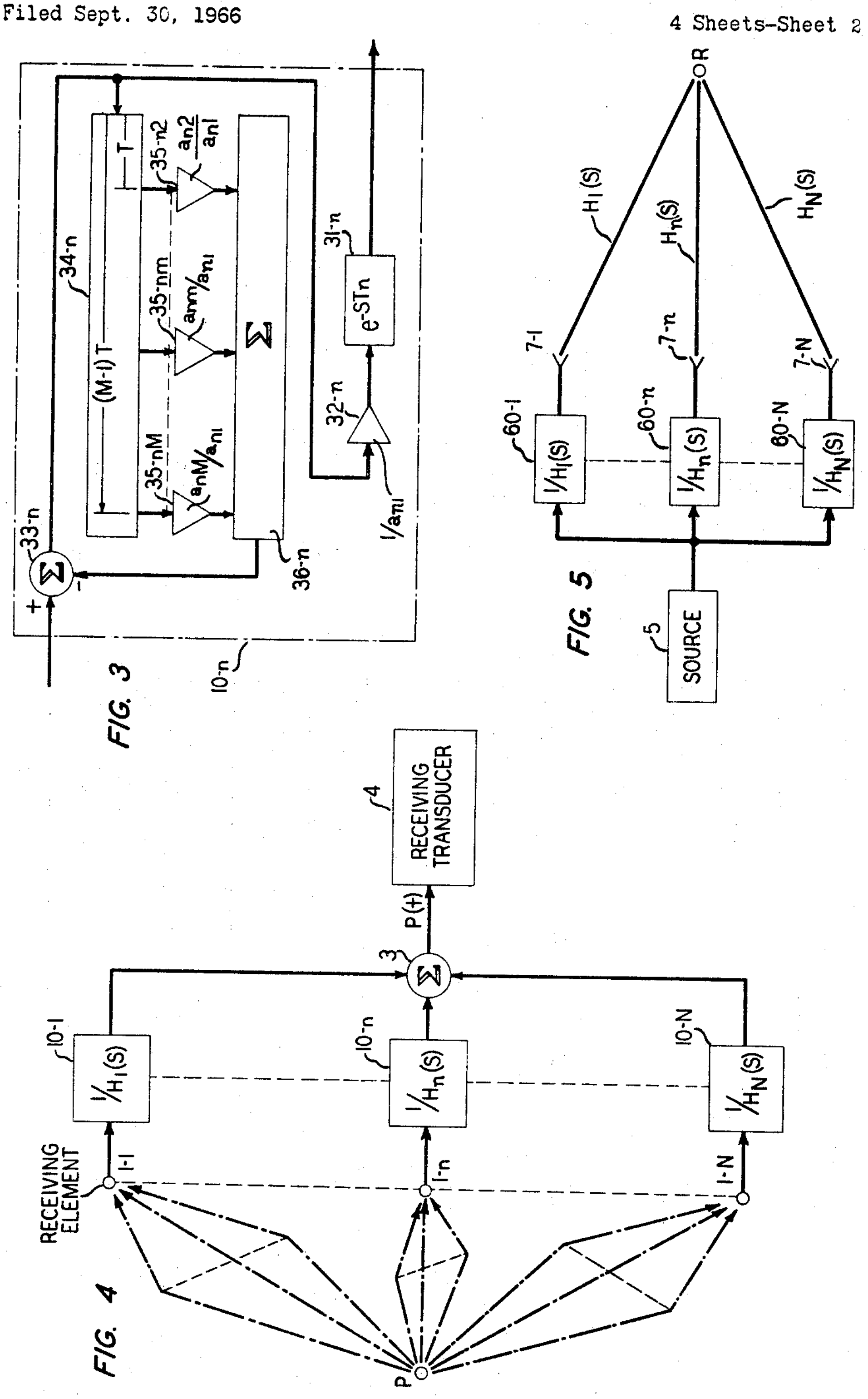
FIG. 3 is a block diagram of a frequency-inverse filter constructed according to the principles of this invention to compensate for the phase and amplitude characteristics of a dispersive transmission channel.
FIG. 4 is a schematic block diagram of a receiving array constructed according to this invention.
FIG. 5 is a block diagram of a transmitting array utilizing the principles of this invention.

In a bounded reverberant volume, such as a room, sound studio, or auditorium, acoustic signals travel from a source to a receiver over multiple transmission paths. If, as shown in FIG. 4, the receiver consists of an array of receiving elements 1–1 to 1–N, each element 1–$n$ in general detects as many versions of the transmitted signal as there are transmission paths to it from the source P, where $n$ and N are positive integers and $n$ has a value given by $1 \leq n \leq N$.

Each receiving element can comprise, for example, a high-quality microphone or similar transducer capable of operating over the frequency range occupied by the transmitted signals. Such transducers are well known in the art and thus will not be described in detail.

In the usual case of a dispersionless transmission medium (that is, a medium in which propagation velocity is independent of frequency), an impulse generated at the source P is received by each receiving element as a series of unequally delayed and unequally attenuated impulses. Thus, the transfer function $H_n(s)$ of the transmission channel from the selected source P to the $n$th receiving element 1–$n$ can be written as the transform of a train of attenuated and delayed impulses:

$$H_n(s) = \sum_{k=1}^{K} a_{nk} e^{-s\tau_{nk}} \qquad (1)$$

Here K is the total number of separate transmission paths from the source P to the $n$th receiving element, $a_{nk}$ is the attenuation of the impulse transmitted over the $k$th path to the $n$th receiving element, $\tau_{nk}$ is the delay of this impulse, $s$ is the complex frequency, and $k$ is a positive integer given by $1 \leq k \leq K$.

If the delays are ordered such that $$\tau_{n1} < \tau_{n2} < \cdots < \tau_{nK}$$

Equation 1 can be rewritten as $$H_n(s) = a_{n1} e^{-s\tau_{n1}} \left[ 1 + \sum_{k=2}^{K} A_{nk} e^{-sT_{nk}} \right] \qquad (2)$$

In Equation 2

$$A_{nk} = a_{nk}/a_{n1}$$

and $$T_{nk} = (\tau_{nk} - \tau_{n1})$$

If $$\sum_{k=2}^{K} A_{nk} e^{-sT_{nk}} = \alpha \qquad (3)$$

then $$H_n(s) = a_{n1} e^{-s\tau nl} [1 + \alpha] \qquad (4)$$

and a filter with phase and amplitude characteristics inverse to those of the transmission channel is given by $$1/H_n(s) = [1/(1+\alpha)] \cdot e^{s\tau_{n1}/a_{n1}} \qquad (5)$$

Figure 1:
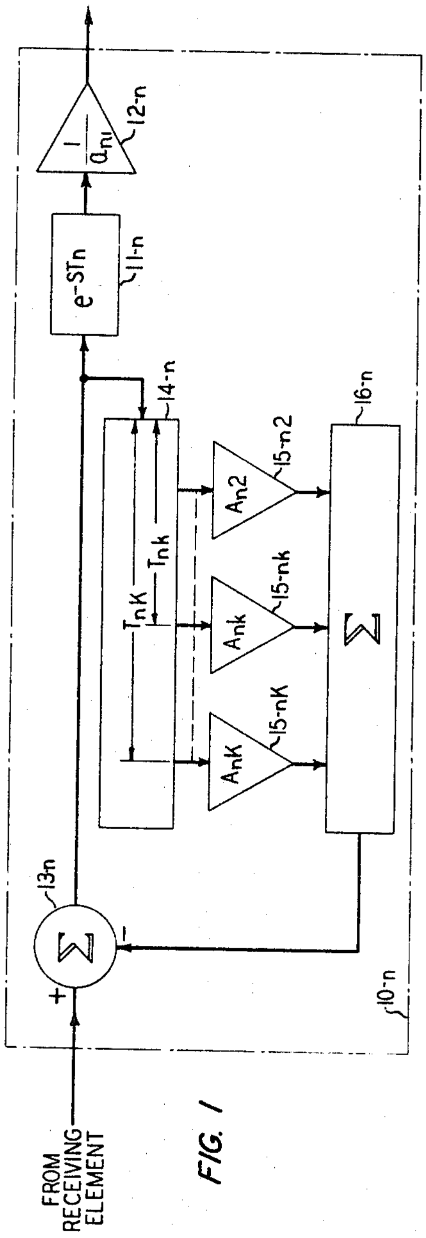
FIG. 1 is a schematic diagram of a frequency-inverse filter constructed according to the principles of this invention.

The term $1/(1+\alpha)$ in Equation 5 can be synthesized exactly by a feedback circuit of the type shown in FIG. 1. consisting of summing network 13–$n$, delay line 14–$n$, amplifiers or weighting networks 15–$nk$ and summing network 16–$n$. This feedback network with unity forward gain and a gain of $\alpha$ in the feedback path, is stable when $H_n(s)$ is a so-called minimum phase transmission function; that is, when $H_n(s)$ has no zeros in the right-half complex $s$ plane. This condition exists, for example, when $A_{n1} > A_{n2} > \ldots > A_{nk}$.

As shown in Equation 3, the term $\alpha$ in Equation 5 represents the sum of a series of unequally attenuated and unequally delayed pulses. The individual terms in such a sum are produced by passing a pulse through a delay line, such as delay line 14–$n$ in FIG. 1, with K–1 output taps spaced along the delay line at distances corresponding to the differential delays $T_{nk}$ of the K transmission paths. The $k$th output tap is connected to an amplifier or weighting network 15–$nk$ which attenuates, or amplifies if necessary, the corresponding output impulse an amount $A_{nk}$ equal to the ratio of the attenuation of the impulse transmitted along the $k$th transmission path to the attenuation of the impulse transmitted along the shortest transmission path. The delayed, attenuated impulses are summed in network 16–$n$ to generate a feedback signal proportional to $\alpha$. This feedback signal is in turn subtracted in network 13–$n$ from the signal detected by the $n$th receiving element to generate the output signal from the feedback network.

Delay lines are well known in the signal processing arts and thus line 14–$n$ will not be described in detail. For example, an appropriate delay line for use in this invention is described in Millman and Taub, "Pulse and Digital Circuits," McGraw-Hill Book Company, Inc., 1956, on p. 291.

The output signal from the feedback network is delayed in synchronizing delay 11–$n$ to ensure that the output signal from filter 10–$n$ is in time synchrony with the output signals from the other filters 10 (FIG. 4) connected to the other receiving elements 1. Thus, the delay time $T_n$ of delay 11–$n$ is selected to be equal to the difference between (1) the shortest transmission time of a signal from the source P to the receiving element farthest from the source and (2) the shortest transmission time of the same signal from the source P to the $n$th receiving element. As indicated by Equation 5, the signal from delay 11–$n$ is then passed through amplifier 12–$n$ possessing a gain $1/a_{n1}$, selected to cancel the attenuation of the signal transmitted over the shortest transmission path ($k=1$) between source P and receiving element 1–$n$.

Similarly processed output signals from the other receiving element-filter combinations are combined in summing network 3 (FIG. 4) to produce a replica of the received signal. Receiving transducer 4 receives this replica and converts it into the desired form. Transducer 4 could, for example, be a recording device or a loudspeaker.

Because of the frequency inverse filtering afforded by a filter constructed in accordance with Equation 5 the received signal is an excellent replica of the transmitted signal. For those practical situations which lead to a stable inverse filter, the effect of the multipath transmission channel is completely removed.

*Other frequency-inverse filter embodiments*

An approximate implementation of the frequency-inverse filters 10 shown in FIG. 4 is based, in accordance with the principles of this invention, on Equation 5 rewritten in the form $$1/H_n(s)=[1-\alpha+\alpha^2/(1+\alpha)]e^{sT_{n1}/a_{n1}} \quad (6)$$

If $\alpha^2/(1+\alpha)$ is small compared to $\alpha$, which is the case *when* $A_{n1}>>A_{n2}> \ldots >A_{nK}$, then Equation 6 becomes $$1/H_n(s)\approx[1-\alpha]\cdot e^{sT_{n1}/a_{n1}} \quad (7)$$

Figure 2:
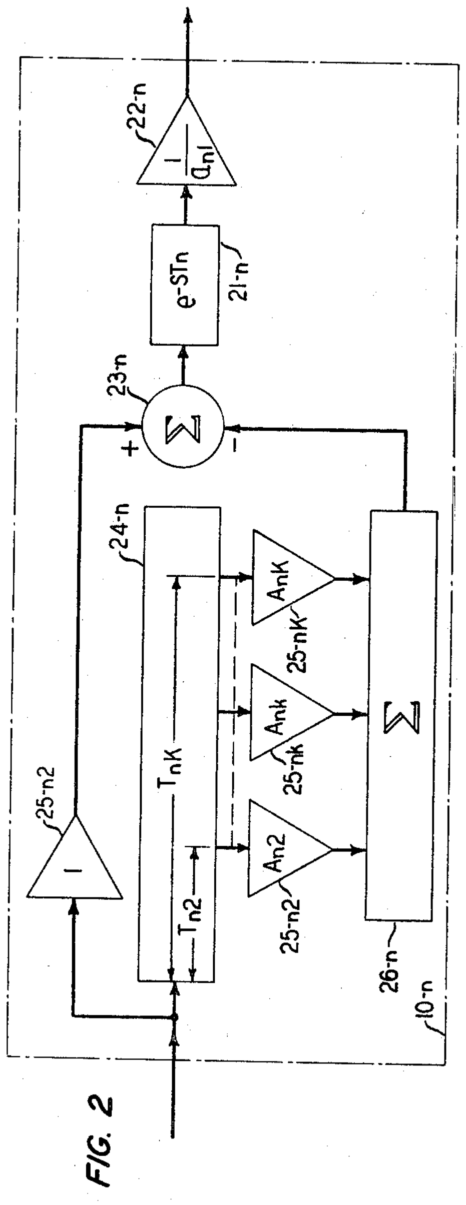
FIG. 2 is a schematic block diagram of an approximate frequency-inverse filter constructed according to the principles of this invention.

FIG. 2 shows the frequency-inverse filter constructed according to Equation 7. The signal from the *n*th receiving element is passed through delay line 24–*n*, identical to delay line 14–*n* in FIG. 1. K output taps are spaced along the delay line at distances corresponding to the differential delays $T_{nk}$ of the K transmission paths from the source P to the *n*th receiving element. The *k*th output tap is connected to a corresponding amplifier or weighting network 25–*nk*, identical to the amplifier 15–*nk* shown in FIG. 1. Amplifier 25–*nk* attenuates or amplifies the output impulse from the *k*th tap an amount equal to $A_{nk}$. The delayed, amplified or attenuated impulses are summed in network 26–*n* and then substracted in network 23–*n* from the undelayed received signal. The resulting signal is delayed in delay 21–*n* by the amount $T_n$ necessary to ensure that it is in time synchrony with the output signals from the other filters connected to the other receiving elements. The signal from delay 21–*n* is then amplified by the amount $1/a_{n1}$ and amplifier 22–*n* and combined in network 3 (FIG. 4) with similarly processed signals from the other receiving elements to form a replica of the transmitted signal.

A third embodiment of frequency-inverse filter 10 (FIG. 4) is shown in FIG. 3. This embodiment contains a delay line with a large number of taps spaced at the Nyquist sampling interval $T=½f$, where $f$ is the highest significant frequency component in the received signal. This embodiment is particularly useful when the transmission medium is dispersive (that is, when propagation velocity is a function of frequency) because in this case the transmission medium stretches and distorts an impulse generated at source P (FIG. 4) into a waveform other than an impulse function at each receiving element. Thus, a dispersive transmission channel no longer has a transfer function given by Equation 1. Rather, the transfer function for the transmission channel can be approximated by the complex frequency transform of a series of impulses or samples spaced apart in time by the Nyquist sampling interval. Each sample possesses an amplitude proportional to the amlitude of the impulse response of the transmission channel at the corresponding time.

Thus, the transfer function $H_n(s)$ for a dispersive multipath channel between the source P and the *n*th receiving element can be derived by considering the number of separate transmission paths K constituting this medium to be equal to the number of samples M necessary to represent the impulse response generated at the *n*th receiving element by an impulse at source P. Therefore, $$H_n(s)=\sum_{m=1}^{M}a_{nm}e^{-s(mT+T_0)} \quad (8)$$

where M is the total number of samples necessary to represent the impulse response generated at the *n*th receiving element by an impulse at source P, $T_0$ is the earliest time at which the impulse response generated by the impulse at source P is detected at the *n*th receiving element, T is the Nyquist sampling interval determined by the highest significant frequency component in the impulse response of the dispersive transmission channel at the *n*th receiving element, $a_{nm}$ is the amplitude of the *m*th sample and *m* is the summing index, a positive integer given by $1\leqq m\leqq M$. In general, M is a function of the duration of the impulse response of the dispersive transmission channel.

By analogy to Equations 2 through 5, a frequency-inverse filter with amplitude and phase characteristics inverse to those of the transmission channel is given by the inverse of Equation 8 as $$1/H_n(s)=[1/(1+\beta)]\cdot e^{s(T+T_0)/a_{n1}}$$

where $$\beta=\sum_{m=2}^{M}[a_{nm}/a_{n1}]\cdot e^{-s(m-1)T} \quad (10)$$

Thus, the filter inverse to the amplitude and phase characteristics of the dispersive transmission channel contains a feedback loop with gain $\beta$. The term $\beta$, where $\beta$ is defined by Equation 10, can be synthesized by a delay line with M–1 output taps spaced apart by the Nyquist sampling interval T, together with appropriate amplifiers and a summing network.

As shown in FIG. 3, the signal from the *n*th receiving element passes through subtracting network 33–*n*, and enters delay line 34–*n*, which contains M–1 output taps. The signal from the *m*th output tap is attenuated or, if necessary, amplified, by $a_{nm}/a_{n1}$ in amplifier 35–*nm*. The attenuated or amplified output signals from all the taps are summed in network 36–*n* to generate the feedback signal. This feedback signal in turn is subtracted in network 33–*n* from the input signal generated by the *n*th receiving element. Amplifier 32–*n* amplifies the output signal from the feedback network by the amount $1/a_{n1}$. *Delay* 31–*n* then delays this amplified output signal by $T_n$ seconds so as to synchronize this output signal with the output signals from all the other receiving elements at network 3 (FIG. 4).

Equation 9, as do Equations 5 and 7, calls for advancing the signal received at the *n*th receiving element by a selected time to compensate for the phase shift of this signal during the travel time of the impulse generated at source P (FIG. 4) over the shortest path to the *n*th receiving element. An instantaneous phase advance is of course impossible in a real-time system. Thus network 31–*n* introduces a constant delay $T_n$ selected, as explained earlier, to be equal to the difference between (1) the shortest transmission time of an impulse from the source P to the receiving element farthest from this source and (2) the shortest transmission time of the same signal from the source P to the *n*th receiving element. This ensures that the output signals from all the filter-receiving element combinations are synchronized at network 3 (FIG. 4).

*Transmission apparatus using frequency-inverse filters*

Transmitting apparatus constructed according to the principles of this invention, and capable of producing a replica of a transmitted signal at a selected focal volume R and noise at all other points, is shown in FIG. 5. The signal to be transmitted, generated in source 5, is simultaneously sent along N separate paths, each path containing a frequency-inverse filter 60–*n* and a transmitting element 7–*n*. Each frequency-inverse filter is proportioned to compensate for the phase and the amplitude characteristics of the transmission channel between its corresponding transmitting element and the selected focal volume R in a bounded reverberant volume. Thus, the signal to be transmitted is passed through N frequency-inverse filters 60 and is then transmitted from each of the transmitting elements 7 at times selected to ensure the simultaneous arrival at region R of the signals transmitted from each of the transmitting elements.

Filters 60 can be identical to the filter shown in FIG. 1, FIG. 2, or FIG. 3. Indeed, because the transmission channel from each transmitting element to the region R is bilateral (that is, its characteristics are independent of the direction of signal travel), the filters used in the receiving apparatus shown in FIG. 4 can, if appropriate, be employed in the transmitting apparatus shown in FIG. 5.

*Search apparatus*

Each point $p$ in a bounded reverberant volume has, in general, a unique set of transfer functions, $H_{1,p}(s)$ through $H_{N,p}(s)$, describing the channels between that point and each receiving element in an array of N such elements, Thus, a system capable of determining the location of the source of a sound of known characteristics is possible using the principles of this invention.

An array of N fixed receiving elements in calibrated by well known techniques so that the transfer functions of the channels between a large number, P, of known points in the volume or medium, and each receiving element in the array are known. The signal of known characteristics detected at each receiving element in the array is recorded. By passing the signal so recorded through the P sets of frequency-inverse filters corresponding to the P known locations in the medium, the set of filters which yields the "best" replica of the known transmitted signal can be determined. Since this set of filters corresponds to a known point P in the reverberant volume, the most probable location of the source of the detected sound is in the vicinity of this point.

Figure 6:
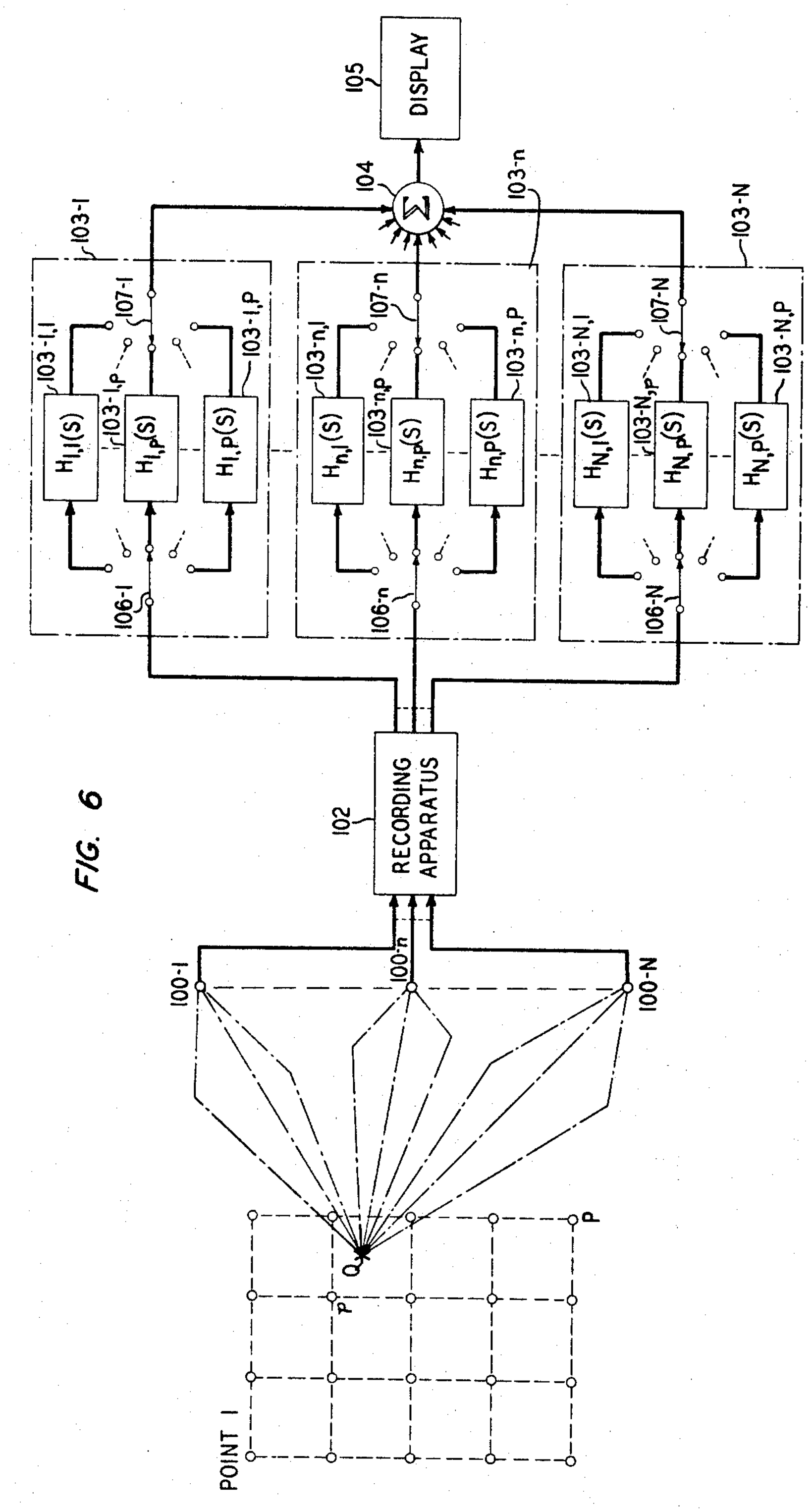
FIGS. 6 and 7 are block diagrams of systems for determining the locations of the sources of known sounds, based on the principles of this invention.
Figure 7:
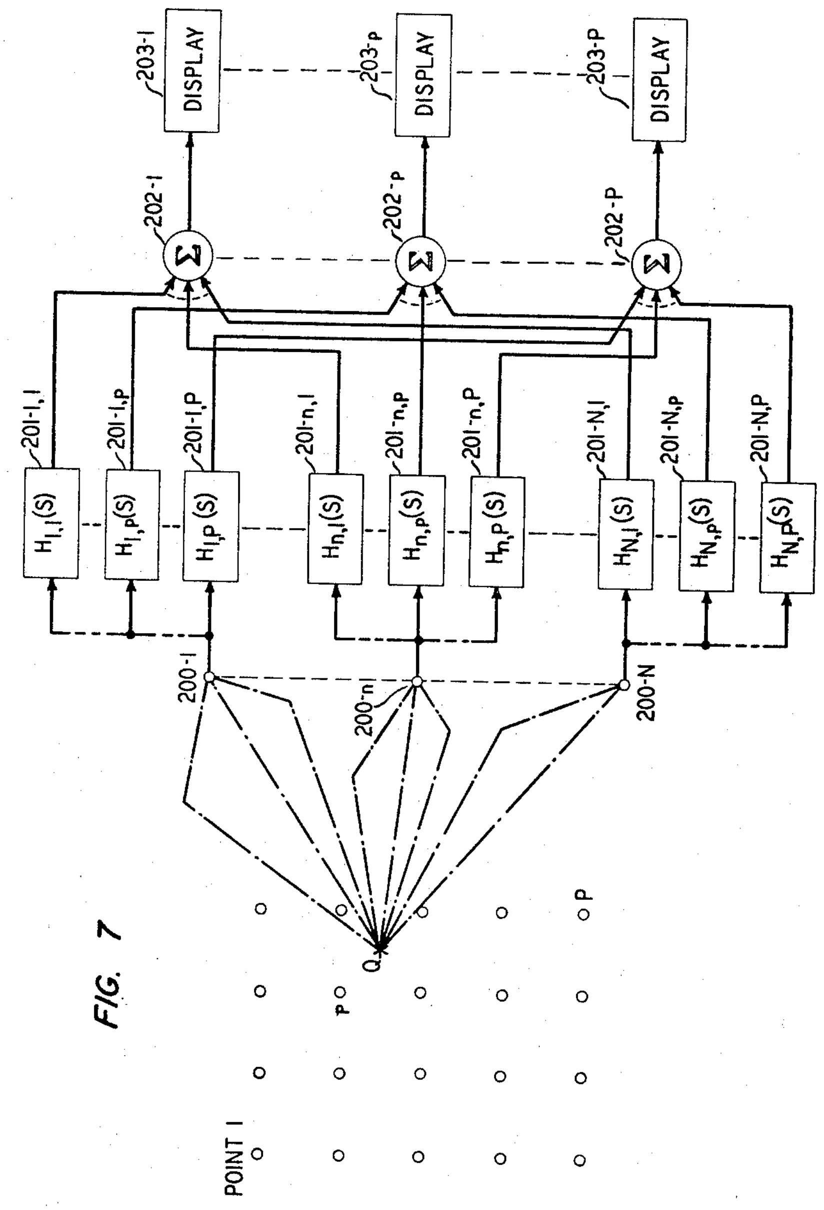

Embodiments of the invention using this principle are shown in FIGS. 6 and 7. In FIG. 6, the sound of known characteristics from a source Q at an unknown location is transmitted by multiple transmission paths to each receiving element in an array of receiving elements 100–1 through 100–N. The signal detected by each receiving element is recorded on a multi-channel type in recording apparatus 102. Each channel of the tape corresponds to one of the receiving elements. Recording apparatus 102 provides a permanent record of the signals detected by the N receiving elements 100. The recording apparatus can, if desired, simultaneously record and re-record the signals detected by the receiving elements 100. The recording provides a permanent record of the detected signals, while the re-recording makes possible the analysis of the recorded information during the recording process. Recording apparatus capable of operating in the above described manner is well known in the signal processing arts and thus will not be described in detail.

The signals on the recording channels are passed simultaneously through a set of N frequency-inverse filters 103–1, $p$ through 103–N, $p$ each with amplitude and phase characteristics inverse to those of the transmission channel between the point $p$ and a corresponding one of the N receiving elements 100. Switches 106–1 through 106–N and 107–1 through 107–N allow the received signals to be passed through the set of frequency-inverse filters corresponding to any calibration point $p$ in the volume.

The signals passed through a particular set of filters are transmitted to summing network 104. When the set of frequency-inverse filters through which the received signal is passed corresponds to the calibation point $p$ nearest the unknown location of the source Q of the known sound, a good replica of the known sound is produced by network 104. Thus, the location of the known sound is most probably at or near the point $p$ for which these filters were calibrated.

The output signal from summing network 104 is sent to display apparatus 105. Display 105 can be a loudspeaker, a set of earphones, a cathode ray tube, a tape recorder, or any other selected display device capable of producing a measure of the received signal. For example, in one embodiment, display 105 contains a correlation generator which correlates the signal from network 104 with a reference signal representing the known sound. Thus, when the known sound is received and the correct set of fequency-inverse filters is used to process this sound, display 105 generates a maximum correlation function. The set of filters 103 used to generate this maximum correlation function gives the most probable source of this sound.

In FIG. 7, the signals received at the receiving elements 200 are passed imultaneously through the P sets of N frequency-inverse filters, 201–1, 1 through 201–N, 1 to 201–1, P through 201–N, P, corresponding on a one-to-one basis to the P calibration points throughout the bounded reverberant volume. The signals passed through the filters 201–1, $p$ through 201–N, $p$, corresponding to the $p$th calibration point in the volume, are combined in summing network 202–$p$ and sent to display 203–$p$. As explained above, displays 203 produce output signals which indicate when the location of the source of the known sound is adjacent the point $p$.

Other embodiments of this invention will be obvious in light of this disclosure to those skilled in the signal processing arts. In particular, while the embodiments of this invention have been described for acoustic signals, other embodiments capable of operating with electromagnetic signals will be apparent from the above disclosure. Further, in some situations, obvious to those skilled in the art, a single receiving or transmitting element, used in conjunction with a frequency-inverse filter of the type described above, will yield a satisfactory replica of the transmitted signal.

What is claimed is:

1. An approximate frequency-inverse filter comprising
means for deriving a plurality of delayed versions of an input signal,
means for amplifying each of said delayed versions,
means for summing said amplified delayed versions to produce an intermediate signal,
means for generating an output signal proportional to said input signal minus said intermediate signal,
means for amplifying said output signal, and
means for delaying said output signal.

2. Apparatus which comprises the tandem connection of
a feedback network possessing an input and an output lead, unity forward gain, and a transversal filter in its feedback path,
an amplifier, and
a delay network.

3. Apparatus as in claim 2 in which said feedback network comprises
a delay line connected to said output lead,
a plurality of output taps connected to said delay line,
a plurality of amplifiers connected on a one-to-one basis to said output taps,
a summing network possessing a plurality of input terminals connected on a one-to-one basis to said amplifiers, and an output terminal, and
a subtracting network possessing a first terminal connected to said input lead, a second terminal connected to said output terminal, and a third terminal connected to said output lead.

4. Apparatus as in claim 3 in which said plurality of output taps comprise
K–1 output taps connected to said delay line at positions corresponding to the differential delays associated with the K–1 longest transmission paths in a selected multipath transmission channel, where K is equal to the total number of transmission paths in said multipath transmission channel.

5. Apparatus as in claim 3 in which said plurality of output taps comprise
M–1 output taps connected to said delay line, the $m$th tap being connected to said delay line at a position corresponding to a delay of $(m-1)$T, where T is a selected Nyquist sampling interval, M is a positive integer equal to the number of samples necessary to represent the impulse response of a selected multipath transmission channel, and $m$ is a positive integer given by $2 \leq m \leq M$.

6. A frequency-inverse filter comprising a delay line with an input lead comprising the input lead to said filter, and a plurality of K output taps placed at predetermined locations on said delay line, a plurality of amplifiers connected on a one-to-one basis to said plurality of output taps, a summing network containing K–1 input terminals connected on a one-to-one basis to the last K–1 of said amplifiers, and an output terminal, a subtracting network possessing a first terminal connected to the first of said plurality of amplifiers, a second terminal connected to said output terminal from said summing network, and a third terminal containing a signal proportional to the signal on said first terminal minus the signal on said second terminal, an amplifier connected to said third terminal from said subtracting network, and a synchronizing delay connected to said amplifier, said synchronizing delay possessing an output terminal which constitutes the output lead from said filter.

7. Apparatus which comprises:

an array of receiving elements, each of said receiving elements connected to a source of an acoustic signal by a multipath transmission channel; a plurality of compensating means connected on a one-to-one basis to said receiving elements, said compensating means comprising the series connection of a feedback network with unity gain in its forward path and a transversal filter in its feedback path, an amplifier, and a synchronizing delay network; and means for combining the signals from said compensating means to produce a replica of said acoustic signal.

8. Apparatus as in claim 7 in which said feedback network comprises a delay line with an input terminal connected to said output lead, and a plurality of output taps placed at predetermined locations on said delay line, a plurality of amplifiers connected on a one-to-one basis to said plurality of output taps, a summing network possessing a plurality of input terminals connected on a one-to-one basis to said amplifiers, and an output terminal, and a subtracting network possessing a first terminal connected to said input lead, a second terminal connected to said output terminal, and a third terminal connected to said output lead.

9. Apparatus as in claim 8 in which said delay line possesses a plurality of M–1 output taps connected to said delay line, the $m$th tap being connected to said delay line at a position corresponding to a delay of $(m-1)T$, where T is a selected Nyquist sampling interval, M is a positive integer equal to the number of samples necessary to represent the impulse response of the corresponding multipath transmission channel, and $m$ is a positive integer given by $2 \leq m \leq M$.

10. Apparatus which comprises:

an array of receiving elements, each of said receiving elements connected to a source of acoustic signals by a multipath transmission channel;

a plurality of compensating means connected on a one-to-one basis to said receiving elements, each of said compensating means including: an amplifier, a synchronizing delay, and a feedback network, said feedback network possessing an input and an output lead, said feedback network further including a delay line with an input terminal connected to said output lead, a plurality of K–1 output taps connected to said delay line at positions corresponding to the differential delays associated with the K–1 longest transmission paths in the corresponding multipath transmission channel where K is equal to the total number of transmission paths in said corresponding multipath transmission channel, a plurality of amplifiers connected on a one-to-one basis to said plurality of output taps, a summing network possessing a plurality of input terminals connected on a one-to-one basis to said amplifiers and a summing network output terminal, and a subtracting network possessing a first terminal connected to said input lead, a second terminal connected to said summing network output terminal and a third terminal connected to said output lead;

and means for combining the signals from said compensating means to produce a replica of said acoustic signal.

11. Apparatus which comprises an array of receiving elements, each of said receiving elements connected to a source of an acoustic signal by a multipath transmission channel;

a plurality of compensating means connected on a one-to-one basis to said receiving elements, each of said compensating means comprising a delay line with an input lead comprising the input lead to said compensating means, and a plurality of K output taps placed at predetermined locations on said delay line, where K is a selected positive integer, a plurality of amplifiers connected on a one-to-one basis to said plurality of output taps, a summing network containing K–1 input terminals connected on a one-to-one basis to the last K–1 of said amplifiers, and an output terminal, a subtracting network possessing a first terminal connected to the first of said plurality of amplifiers, a second terminal connected to said output terminal from said summing network, and a third terminal containing a signal proportional to the signal on said first terminal minus the signal on said second terminal, an amplifier connected to said third terminal from said subtracting network, and a synchronizing delay connected to said amplifier, said synchronizing delay possessing an output terminal which constitutes the output lead from said compensating means; and means for combining the signals from said compensating means to produce a replica of said acoustic signal.

12. Apparatus which comprises a source of a signal, an array of acoustic transmitting elements positioned in a bounded reverberant medium in such a manner that there exists a multipath transmission channel between each of said transmitting elements and a focal volume in said medium at which it is desired to produce an acoustic replica of said signal, and a plurality of filters connected to said source, and, on a one-to-one basis, to said transmitting elements, each of said filters possessing amplitude and phase characteristics inverse to those of the multipath transmission channel between its corresponding transmitting element and said focal volume.

13. Apparatus which comprises a source of a signal, an array of acoustic transmitting elements positioned in a bounded reverberant medium so that there exists a separate multipath transmission channel between each of said transmitting elements and a focal volume in said medium, and a plurality of frequency-inverse filters connected both to said source, and, on a one-to-one basis, to said transmitting elements.

14. Apparatus as in claim 13 in which each of said plurality of frequency-inverse filters comprises the series connection of a feedback network possessing an input and an output lead, unity forward gain and a transversal filter in its feedback path, an amplifier, and a synchronizing delay.

15. Apparatus as in claim 14 in which said feedback network comprises
- a delay line with an input terminal connected to said output lead, and a plurality of output taps placed at predetermined locations on said delay line,
- a plurality of amplifiers connected on a one-to-one basis to said plurality of output taps,
- a summing network possessing a plurality of input terminals connected on a one-to-one basis to said amplifiers, and an output terminal, and
- a subtracting network possessing a first terminal connected to said input lead, a second terminal connected to said output terminal, and a third terminal connected to said output lead.

16. Apparatus as in claim 15 in which said delay line possesses
- a plurality of K–1 output taps connected to said delay line at positions corresponding to the differential delays associated with the K–1 longest transmission paths in the corresponding multipath transmission channel, where K is equal to the total number of transmission paths in said corresponding multipath transmission channel.

17. Apparatus as in claim 15, in which said delay line possesses
- a plurality of M–1 output taps connected to said delay line, the *m*th tap being connected to said delay line at a position corresponding to a delay of $(m-1)T$, where T is a selected Nyquist sampling interval, M is a positive integer equal to the number of samples necessary to represent the impulse response of the corresponding multipath transmission channel, and $m$ is a positive integer given by $2 \leq m \leq M$.

18. Apparatus as in claim 13 in which each of said plurality of frequency-inverse filters comprises
- a delay line with an input lead comprising the input lead to said filter, and a plurality of K output taps placed at predetermined locations on said delay line, where K is a selected positive integer,
- a plurality of amplifiers connected on a one-to-one basis to said plurality of output taps,
- a summing network containing K–1 input terminals connected on a one-to-one basis to the last K–1 of said amplifiers, and an output terminal,
- a substracting network possessing a first terminal connected to the first of said plurality of amplifiers, a second terminal connected to said output terminal from said summing network, and a third terminal containing a signal proportional to the signal on said first terminal minus the signal on said second terminal,
- an amplifier connected to said third terminal from said subtracting network, and
- a synchronizing delay connected to said amplifier, said synchronizing delay possessing an output terminal which constitutes the output lead from said filter.

19. Apparatus for determining the location of the source of a sound of known characteristics in a bounded reverberant medium which comprises
- means for detecting a plurality of versions of said sound,
- means for processing each of said versions to compensate for the phase and amplitude distortion introduced by the transmission channels between said detecting means and each of P calibration points throughout said bounded reverberant medium, where P is a positive integer, and
- means for displaying a measure of said processed versions of said sound to aid in determining the calibration point $p$ most probably closest to said source, where $p$ is an integer with a value given by $1 \leq p \leq P$.

20. Apparatus as in claim 19 in which said detecting means comprises
- N receiving elements, where N is a positive integer.

21. Apparatus as in claim 20 in which said processing means comprises
- an N channel recorder, for recording on a separate channel the versions of said sound detected by each of said N receiving elements,
- a second N channel recorder for re-recording said detected versions of said sound,
- N sets of P frequency-inverse filters, each set corresponding uniquely to a selected channel of said second recorder, and each filter in each set corresponding to a selected one of said P calibration points,
- a first set of N switches for simultaneously connecting each of said N channels of said second recorder to the *p*th frequency-inverse filter in the set of P frequency-inverse filters corresponding to said channel,
- a summing network, and
- a second set of N switches operating in conjunction with said first set for simultaneously connecting the *p*th frequency-inverse filter in each of said N sets to said summing network.

22. Apparatus as in claim 20 in which said processing means comprises
- N sets of P frequency-inverse filters, the filters in the *n*th set being connected in parallel to the *n*th receiving element, where $n$ is a positive integer given by $1 \leq n \leq N$, and
- P summing networks, the *p*th summing network being connected to the *p*th filter in each of said N sets, where $p$ is a positive integer given by $1 \leq p \leq P$.

23. Apparatus as in claim 22 in which said displaying means comprises
- P display devices connected to said P summing networks.

24. Apparatus as in claim 23 wherein said P display device comprise P cathode ray tubes.

25. Apparatus which comprises
- an array of N acoustic receiving elements located in a bounded reverberant medium, where N is a positive integer,
- means for storing the N acoustic signals detected by said N receiving elements,
- P calibration points 1 . . . $p$ . . . P at known locations throughout said medium where $p$ and P are positive integers with $p$ given by $1 \leq p \leq P$,
- P sets of N frequency-inverse filters each, wherein the *n*th filter in the *p*th set possesses amplitude and phase characteristics inverse to those of the transmission channel between the *p*th calibration point and the *n*th receiving element, where $n$ is an integer given by $1 \leq n \leq N$,
- a first set of switches for transmitting said N stored acoustic signals simultaneously to the N frequency-inverse filters in said *p*th set,
- a summing network,
- a second set of switches operated in conjunction with said first set of switches, for connecting said N filters in said *p*th set to said summing network, and
- display means for producing a measure of the signal produced by said summing network.

References Cited

UNITED STATES PATENTS

| | | | |
|---|---|---|---|
| 3,013,209 | 12/1961 | Bickel et al. | |
| 3,162,756 | 12/1964 | Lawrence ------ | 340—15.5 XR |
| 3,193,045 | 7/1965 | Levin. | |
| 3,217,828 | 11/1965 | Mendenhall et al. | |
| 3,275,980 | 9/1966 | Foster. | |
| 3,287,695 | 11/1966 | Taylor. | |
| 3,295,099 | 12/1966 | Lawrence et al. | |

BENJAMIN A. BORCHELT, *Primary Examiner.*

GERALD H. GLANZMAN, *Assistant Examiner.*